United States Patent
Alvanos et al.

(10) Patent No.: US 7,114,339 B2
(45) Date of Patent: Oct. 3, 2006

(54) CAVITY ON-BOARD INJECTION FOR LEAKAGE FLOWS

(75) Inventors: Ioannis Alvanos, Springfield, MA (US); Rajendra Agrawal, South Windsor, CT (US); Hector M. Pinero, Middletown, CT (US); Jin Hu, South Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 182 days.

(21) Appl. No.: 10/813,520

(22) Filed: Mar. 30, 2004

(65) Prior Publication Data

US 2005/0217277 A1    Oct. 6, 2005

(51) Int. Cl.
*F02C 7/12*     (2006.01)
*F01D 11/00*    (2006.01)

(52) U.S. Cl. .......................................... 60/806; 415/115
(58) Field of Classification Search .................. 60/806; 415/115
See application file for complete search history.

(56) References Cited

U.S. PATENT DOCUMENTS

| | | | |
|---|---|---|---|
| 2,603,453 A * | 7/1952 | Sollinger | 415/115 |
| 3,565,545 A * | 2/1971 | Bobo et al. | 415/115 |
| 3,609,057 A * | 9/1971 | Radtke | 415/168.4 |
| 3,628,880 A * | 12/1971 | Smuland et al. | 415/175 |
| 3,670,497 A * | 6/1972 | Sheldon | 60/796 |
| 3,742,705 A * | 7/1973 | Sifford | 60/806 |
| 3,965,066 A * | 6/1976 | Sterman et al. | 415/115 |
| 4,311,431 A | 1/1982 | Barbeau | |
| 5,252,026 A * | 10/1993 | Shepherd | 415/115 |
| 5,402,636 A * | 4/1995 | Mize et al. | 60/806 |
| 5,759,012 A * | 6/1998 | Glezer et al. | 415/115 |
| 6,077,035 A * | 6/2000 | Walters et al. | 415/115 |
| 6,481,959 B1 * | 11/2002 | Morris et al. | 415/115 |
| 6,722,138 B1 * | 4/2004 | Soechting et al. | 60/806 |
| 6,761,529 B1 * | 7/2004 | Soechting et al. | 415/115 |
| 6,945,749 B1 * | 9/2005 | De Cardenas | 415/115 |
| 2002/0098078 A1 * | 7/2002 | Beeck et al. | 415/115 |
| 2002/0159880 A1 | 10/2002 | Morris et al. | |

OTHER PUBLICATIONS

Girgis, et al. "The Effect of Secondary Air Injection on the Performance of a Transonic Turbine Stage," Proceedings of ASME Turbo Expo 2002; Jun. 3-6, 2002, Amsterdam, The Netherlands. GT-2002-30340.

* cited by examiner

*Primary Examiner*—Ted Kim
(74) *Attorney, Agent, or Firm*—Colin L. Cini

(57) ABSTRACT

A gas turbine engine having a turbine section cooling system is disclosed which is able to cool the turbine section of the gas turbine engine to an optimal operating temperature range, while at the same time not substantially degrading engine performance. The disclosure provides a number of different structures for doing so including the provision of turning foils, turning holes, and turning grooves within a secondary air flow cavity which turns or directs cooling and parasitic leakage air into the turbine section in a direction in substantial alignment with a gas flow path through the turbine section.

8 Claims, 7 Drawing Sheets

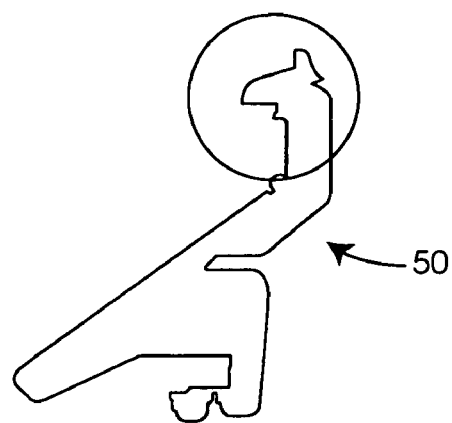
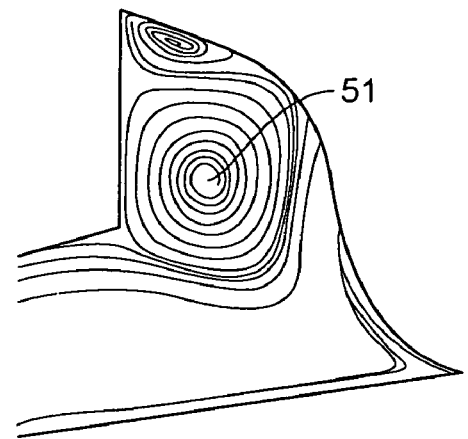
**FIG. 6A
(PRIOR ART)  FIG. 6B
(PRIOR ART)**
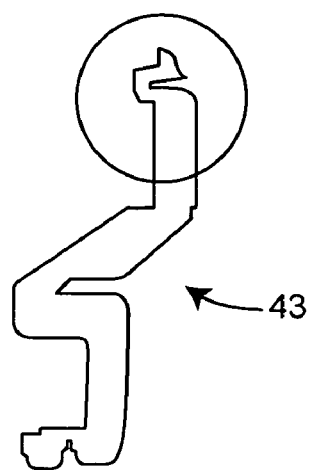
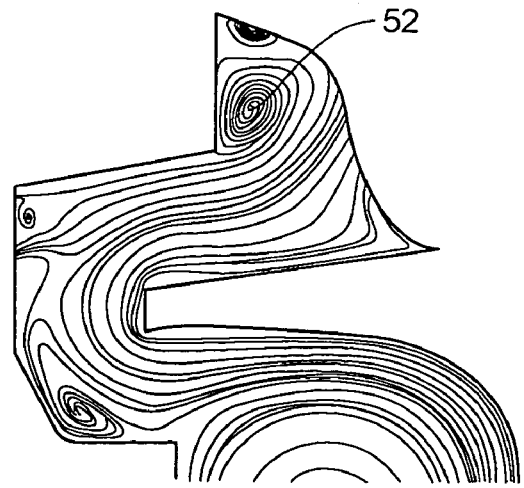
FIG. 7A  FIG. 7B

CAVITY ON-BOARD INJECTION FOR LEAKAGE FLOWS

FIELD OF THE INVENTION

The present disclosure generally relates to gas turbine engines and, more particularly, relates to the turbine section of gas turbine engines.

BACKGROUND OF THE DISCLOSURE

Gas turbine engines are widely applied machines for generating power or thrust. Most typically, they are employed on modern aircraft to provide the propulsion necessary for flight. They may also be used on board such aircraft for power generations or in an APU (Auxiliary Power Unit) capacity to provide for onboard heating, cooling, and ventilation, as well as the operational power and lighting systems onboard the aircraft within the cockpit, passenger cabin, and the like. They may also be used in land-based applications for generation of electrical power or mechanical horsepower in myriad vehicles and pieces of machinery.

In a typical gas turbine engine, three main sections are provided, namely, a compressor section, a combustion section, and a turbine section. Within the compressor section, ambient air is ingested, highly compressed, and directed through a downstream diffuser into the combustion section. Within the combustion section, the highly compressed air is mixed with fuel within an annular combustion chamber and burned at extremely high temperatures generating massive levels of heat energy. Moreover, as opposed to internal combustion engines, wherein the ignition of the fuel is intermittent every two or four strokes of the engine, ignition within a gas turbine engine is continuous, thereby increasing the high power levels attainable by the engine.

From the combustion section, the extremely hot combustion gases are directed to the turbine section downstream of the combustion chamber. As both the turbine section and the compressor section are mounted on the same shaft assembly, rotation of the turbine blades, upon contact with the rapidly expanding and hot combustion gases, causes the shaft to which they are mounted to rotate and in turn causes the compressor blades, also mounted to the shaft, to rotate and thus complete the engine cycle. The discharge of the rapidly expanding hot gases at high velocities from the turbine causes the engine to generate the aforementioned thrust needed for aircraft operation.

While effective, difficulties encountered in the design and operation of gas turbine engines result from the extreme temperatures to which the engine components, particularly the turbine blades, are exposed. Prior art devices have therefore devised schemes for directing cooling air into the turbine section of the gas turbine engine. One example is disclosed in U.S. Patent Application Publication No. U.S. 2002/0159880 A1 which teaches a plurality of orifices within the turbine section for directing cooling air axially through the gas turbine engine and then radially outwardly into the turbine section. Additionally, some cooling air is required to keep the rotor section and static parts of the turbine at acceptable temperatures. This cooling air, referred to as parasitic leakage air, is also injected radially outward into the turbine section.

While such devices are effective in directing cooling or parasitic leakage air into the turbine section, it is not without detrimental effect. More specifically, with such devices the cooling air or parasitic leakage is directed into the turbine section in a direction transverse to the gas flow path of the hot combustion gases moving through the turbine section. As the turbines are driven by this axial gas flow path of the combustion gases, any influx of air in a direction transverse to that flow necessarily detracts from the efficiency of the engine.

Accordingly, one of ordinary skill in the art can readily see that a need exists in the industry for a mechanism by which cooling air can be introduced into the turbine section of a gas turbine engine without significant detrimental effect to the operating efficiency of the engine.

SUMMARY OF THE DISCLOSURE

In accordance with one aspect of the disclosure, a gas turbine engine is disclosed which may comprise a compressor section, a combustion section, a turbine section, and an axial flow plenum extending through the engine. The combustion section may be downstream of the compressor section, while the turbine section may be downstream of the combustion section. The axial flow plenum may include at least one outlet fluidically coupled to the turbine section. The gas turbine engine may further include a fluid flow directional modifier disposed proximate the axial flow plenum outlet.

In accordance with another aspect of the disclosure, a gas turbine engine is disclosed which may include a compressor section, a combustion section, a turbine section, and a turbine section cooling system. The combustion section may be downstream of the compressor section with the turbine section being downstream of the combustion section. Combustion gases may traverse from the combustion section through the turbine section along a combustion gas flow path. The turbine section cooling system may be proximate to the turbine section and direct cooling air and parasitic leakage into the turbine section in the direction of the combustion gas flow path.

In accordance with another aspect of the disclosure, a method of operating a gas turbine engine is disclosed which may include the steps of compressing air in a compressor section of the gas turbine engine, directing compressed air into a combustion section of the gas turbine engine, injecting fuel into the combustion section of the gas turbine engine, directing combustion gases from the combustion section into a turbine section of the gas turbine engine along a combustion gas flow path, and introducing cooling air and parasitic leakage into the turbine section substantially in the direction of the combustion gas flow path.

These and other aspects and features of the disclosure will become more apparent upon reading the following detailed description when taken in conjunction with the accompanying drawings.

BRIEF DESCRIPTION OF THE DRAWINGS

FIG. 6A is a schematic diagram indicating the general flow path of the secondary flow cavity of a prior art system;

FIG. 6B is a schematic diagram indicating the flow path of the inset portion of FIG. 6A;

FIG. 7A is a schematic diagram of the general flow path of the secondary flow cavity constructed in accordance with the teachings of the disclosure;

FIG. 7B is a schematic diagram indicating the flow path of the inset portion of FIG. 7B;

Figure 1:
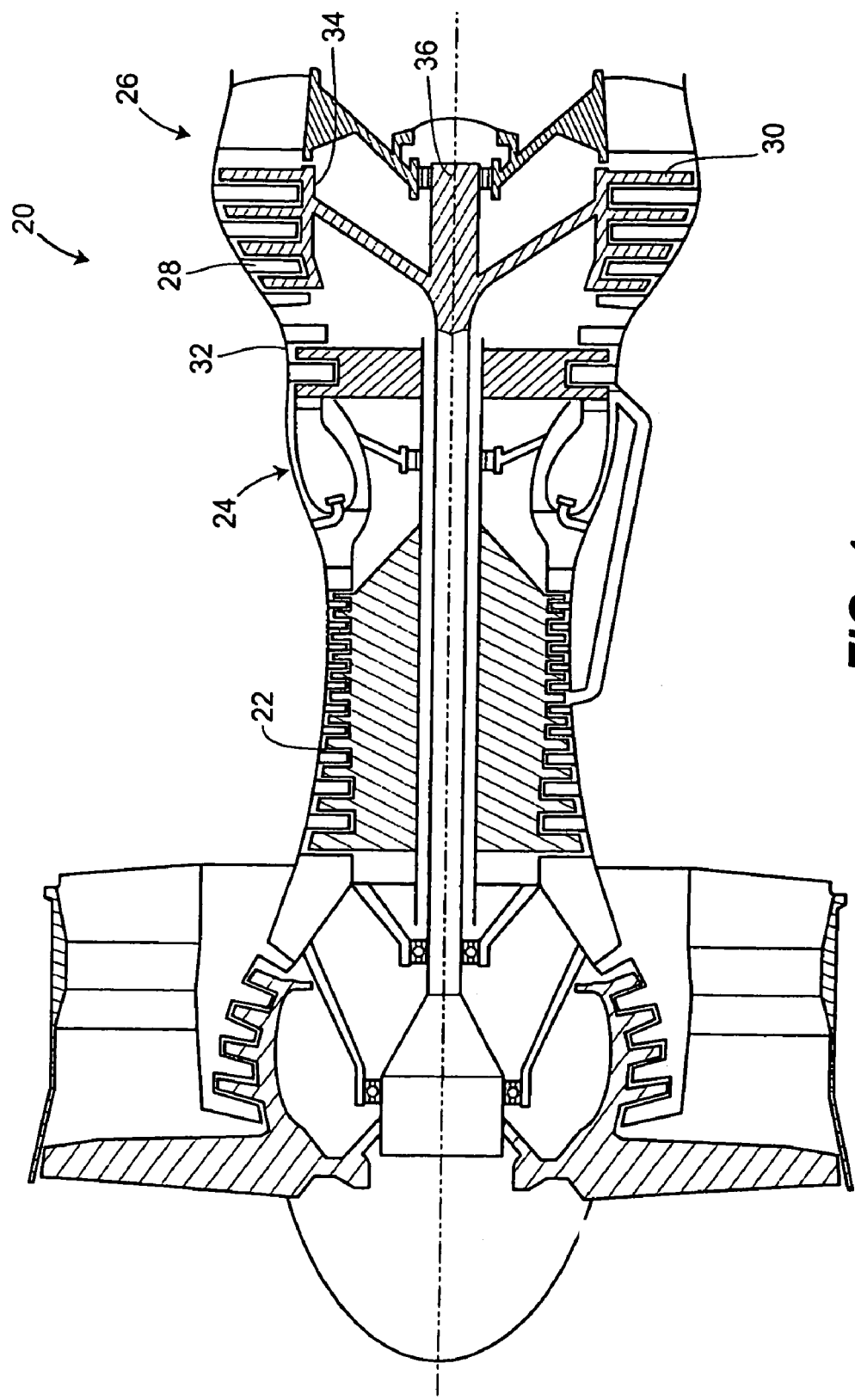
FIG. 1 is a sectional view of a gas turbine engine constructed in accordance with the teachings of the disclosure.

While the following disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions, and equivalents falling within the spirit and scope of the disclosure as defined by the appended claims.

DETAILED DESCRIPTION OF THE DISCLOSURE

Referring now to the drawings, and with specific reference to FIG. 1, a gas turbine engine constructed in accordance with the teachings of the disclosure is generally referred to by reference numeral 20. As one with ordinary skill in the art will readily recognize, the gas turbine engine 20 includes a compressor section 22, a combustion section 24, and a turbine section 26. Generally, ambient air is compressed within compressor section 22, and directed to combustion section 24 where it is combined with fuel and ignited. The hot combustion gases resulting from ignition are then directed to the turbine section 26 and cause the turbine section to rotate and exhaust air at extremely high velocities.

The turbine section 26 includes a plurality of stator vanes 28 intermeshed with a plurality of rotor blades 30. The stator vanes 28 are fixedly mounted to casing 32 and extend radially inwardly, whereas the rotor blades 30 are mounted to a rotatable rotor 34 and extend radially outwardly from a rotatable shaft 36. Combustion gases exiting the combustion section 24 are directed by the shape and angle of the turbine vanes 28 so as to impart force against the rotor blades 30 thus causing the rotor 34 and shaft 36 to rotate.

Figure 3:
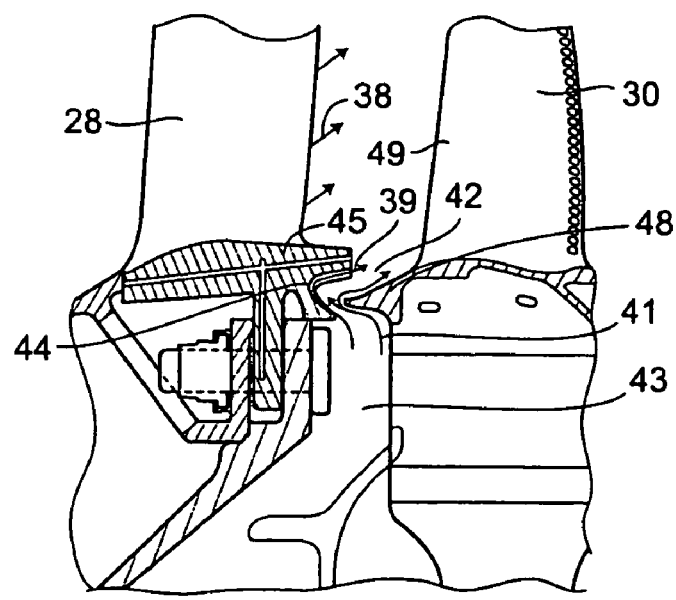
FIG. 3 is an enlarged sectional view of a turbine section cooling section constructed in accordance with the teachings of the disclosure.

However, as opposed to conventional gas turbine engines wherein the primary fluid flow or gas flow path extends in the general direction of arrow 38, and parasitic leakage air is directed into the turbine section 26 along a direction substantially transverse to arrow 38 the present disclosure teaches a turbine section cooling system and method for directing parasitic leakage air into the turbine section 26 in a direction substantially similar to gas flow path 38 as indicated by arrow 39 (See FIG. 3). A number of specific structures are disclosed and described below which enable the parasitic leakage air, also referred to as secondary fluid flow and cooling air, to be so introduced to the turbine section 26. In doing so, not only is the turbine section 26 adequately cooled, but it is cooled without substantially effecting the efficiency of the engine.

Figure 2:
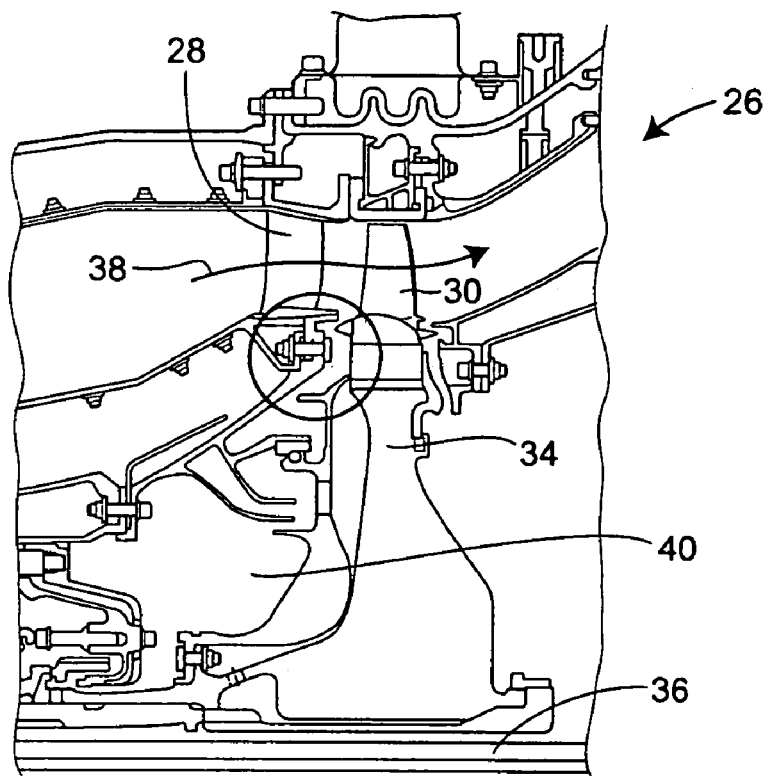
FIG. 2 is an enlarged sectional view of a turbine section of the gas turbine engine constructed in accordance with the teachings of the disclosure.

Referring to FIGS. 2 and 3, in a first embodiment, parasitic leakage is introduced to the turbine section 26 along a radially central plenum 40 substantially coincident with shaft 36 before being directed radially outwardly along path 41 through apertures 42. The central plenum 40, path 41, and apertures 42 combine to form as secondary flow cavity 43. FIG. 3 indicates the direction of such parasitic leakage air flow through the cavity 43. In this first embodiment, the parasitic leakage air is able to be introduced substantially along the direction of gas flow path 38 due to the provision of a plurality of fluid flow directional modifiers 44 provided proximate a trailing edge 45 of the turbine vanes 28. More specifically, in this embodiment, the fluid flow directional modifiers 44 are provided in the form of turning foils 44, wherein each turning foil 44 is provided with an arcuate surface 46 (FIG. 5) which encourages the parasitic leakage air exiting through the secondary flow cavity 43 to be turned so as to be substantially parallel to the gas flow path 38. As a result, the parasitic leakage air not only is able to cool the turbine section 26 to a degree sufficient to protect the hardware of the turbine section 26, but is also able to do so without substantially degrading the performance characteristics of the engine 20. In alternative embodiments it is to be understood that a single fluid flow directional modifier could be prescribed.

Figure 4:
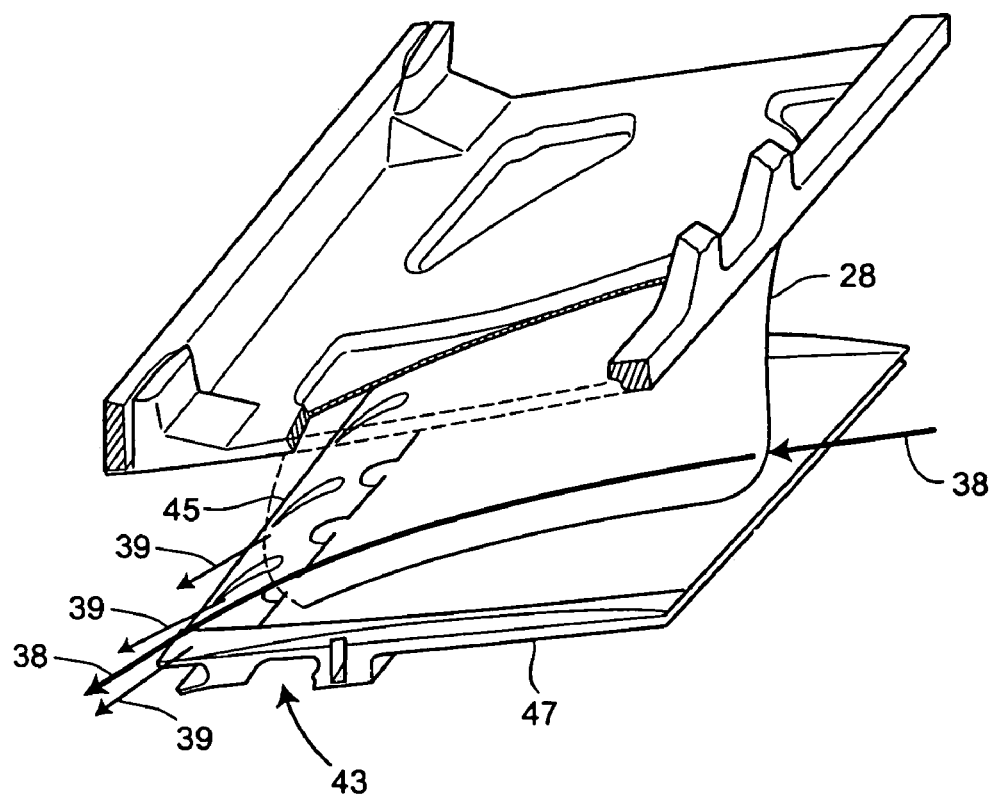
FIG. 4 is a cut-away perspective view of turbine vanes constructed in accordance with the teachings of the disclosure.
Figure 5:
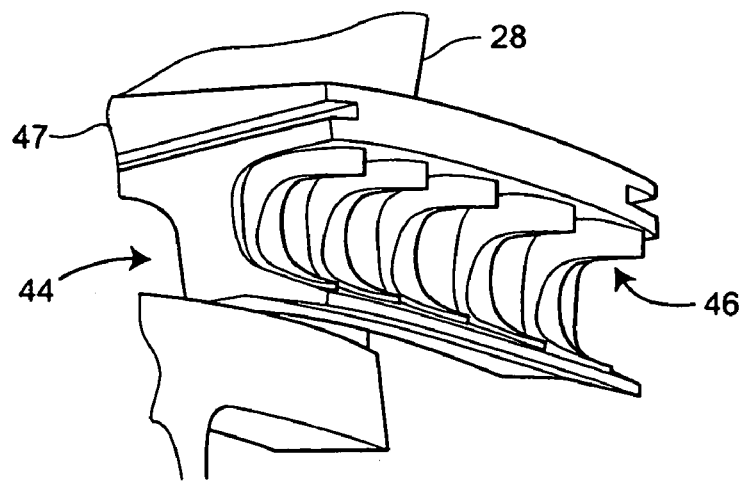
FIG. 5 is an enlarged perspective view of the turning foils of FIG. 4.

As for the actual construction of the turning foils 44, the turning foils can be cast directly into the turbine vanes 28 or may be separately fabricated and welded and/or brazed onto the vanes 28. FIGS. 4 and 5 depict the foils 44 extending directly from a wall 47 forming the trailing edge 45 of the turbine vane 28. The foils 44 may work in concert with a discourager or lip 48 extending from a leading edge 49 of the turbine blade 30 to form the labyrinthine path 41 as shown best in FIG. 3. In so doing, the parasitic leakage air is encouraged to enter the turbine 26 in the desired direction.

Computer models depicted in FIGS. 6A and 6B, as well as FIGS. 7A and 7B, illustrate the substantial advantages gained by the teachings of the present disclosure. First with respect to FIGS. 6A and 6B, they depict a prior art secondary cooling and parasitic leakage system 50 wherein parasitic leakage air is directed radially outwardly and thus transverse to the direction of gas flow in a typical gas turbine engine. As a result, as best depicted in FIG. 6B, substantial recirculation represented by area 51 is generated within the turbine section 26 thereby substantially slowing overall gas flow within the turbine section 26 and thus substantially degrading engine performance. Conversely, as indicated in FIGS. 7A and 7B, the secondary flow cavity 43 of the present disclosure introduces the cooling air substantially in the direction of the gas flow path 38 thereby providing the desired cooling characteristics without substantially effecting engine performance. In fact, in the computer model of FIG. 7B, it will be noted that the area of recirculation 52 is substantially smaller than that depicted in FIG. 6B.

Figure 8:
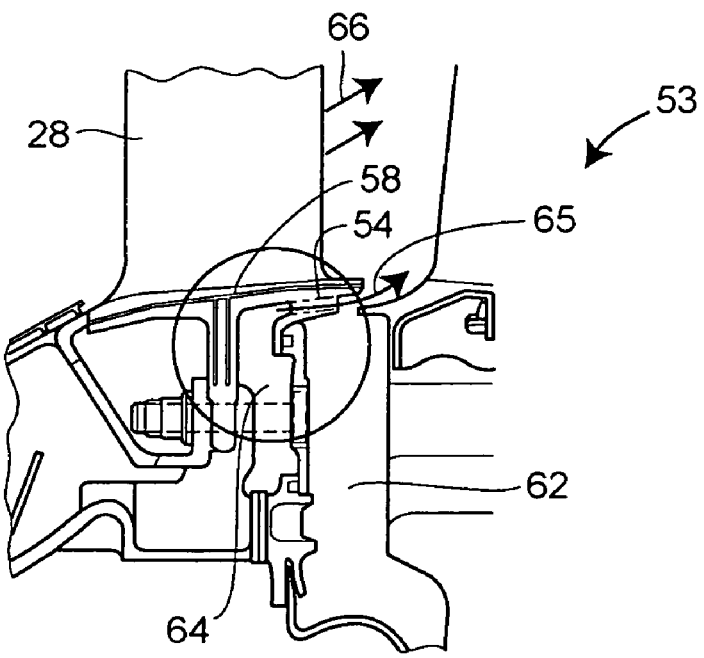
FIG. 8 is a sectional view of an alternative turbine section cooling and parasitic leakage system constructed in accordance with the teachings of the disclosure.
Figure 9:
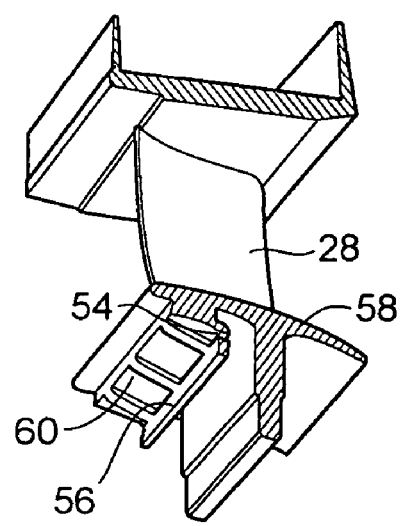
FIG. 9 is a perspective view of the alternative structure of FIG. 8.

Turning now to FIGS. 8 and 9, an alternative construction of a turbine section cooling system constructed in accordance with the teachings of the disclosure is generally referred to by reference numeral 53. As with the first embodiment, the second embodiment of the present disclosure is generally concerned with directing cooling air into the turbine section 26 of the engine 20 without substantially degrading engine performance. In this embodiment, it is able to do so by using a plurality of fluid flow directional modifiers in the form of turning holes 54 as opposed to a plurality of turning foils 44 as with the first embodiment. More specifically, as depicted in FIGS. 8 and 9, a shroud 56 may be provided radially inwardly of a turbine vane wall 58 with the plurality of turning holes 54 being provided therebetween and separated by a plurality of internal partitions 60. In so doing, it can be seen that parasitic leakage air is directed through the secondary flow cavity 43 along a first plenum 62 before being directed through a second plenum 64 and ultimately through the plurality of turning holes 54. By doing this, the air exiting from the turning holes 54 along path 65 is substantially aligned with the overall gas flow path 66 of the engine 20. It is to be understood that in addition to the structure set forth as indicated above, the plurality of turning holes 54 may be alternatively fabricated as by drilling, milling, or any other conventional method known to one of ordinary skill in the art of gas turbine engines. Moreover, grooves or the like, as opposed to fully encircled holes, may be machined into the structure for the same purpose.

Figure 10:
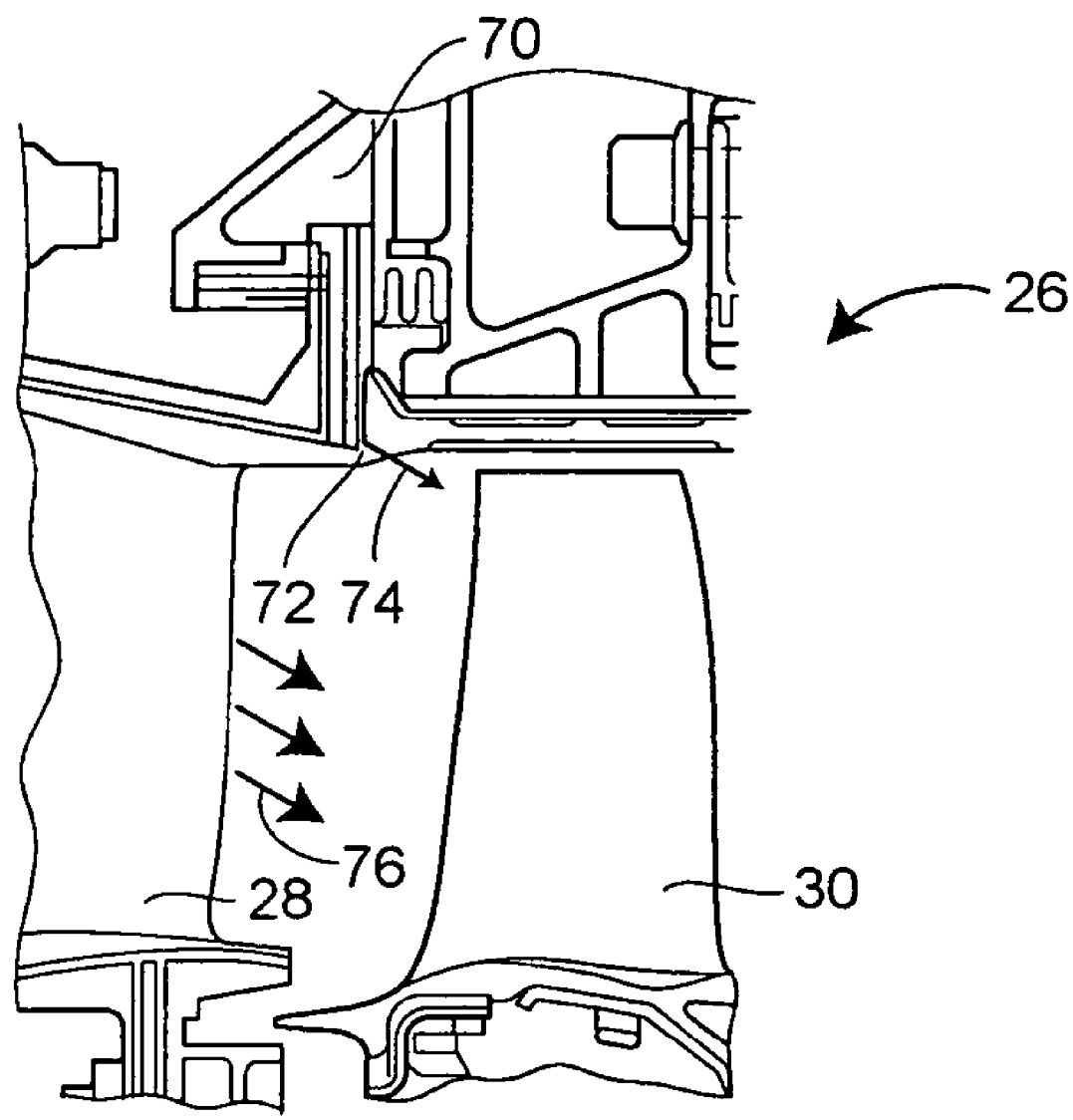
FIG. 10 is a sectional view of a second alternative embodiment of a turbine section cooling and parasitic leakage system constructed in accordance with the teachings of the disclosure.

In a still further embodiment depicted in FIG. 10, the cooling and parasitic leakage air may be directed radially inwardly as opposed to the previously identified embodiments wherein the parasitic leakage air is directed radially outwardly into the turbine section 26. In so doing, air may be directed along an outer annular plenum 70 with a plurality of fluid flow directional modifiers 72 being provided at a radially outwardly disposed section of the turbine section 26. Such modifiers 72 may be provided in the form of turning foils, turning holes, grooves or other embodiments indicated or suggested above. Importantly, however, it will be noted that the secondary fluid flow of the parasitic leakage air generated by this alternative embodiment is directed into the turbine section 26 along an arrow 74 which is substantially similar to the primary fluid flow of the combustion gases as indicated by arrow 76. Accordingly, the parasitic leakage air is provided within the turbine section 26 without substantial degradation in engine performance as with the previously identified embodiments.

Figure 12:
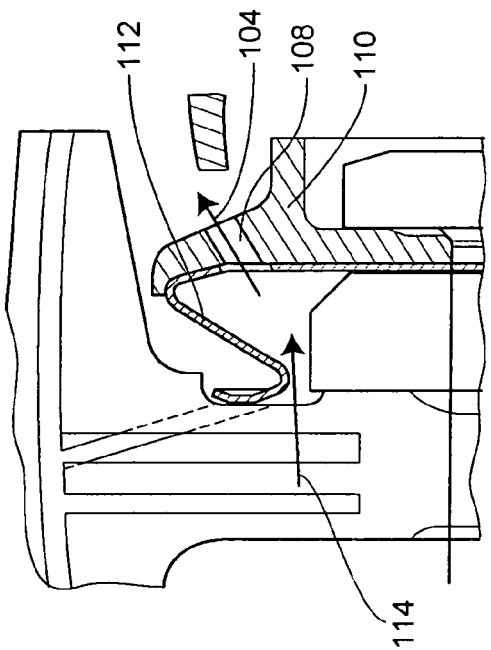
FIG. 12 is an enlarged sectional view of the inset portion of FIG. 11.
Figure 11:
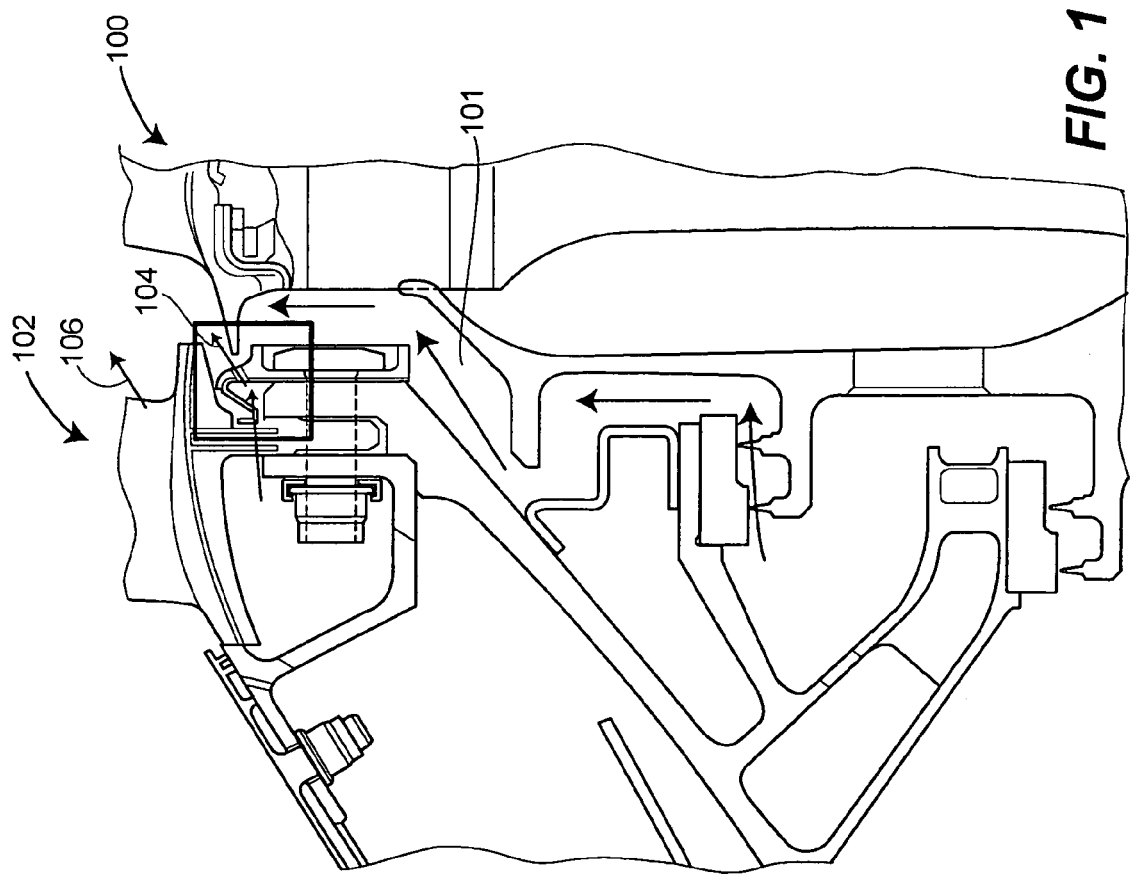
FIG. 11 is a sectional view of a third alternative embodiment of a turbine section cooling and parasitic leakage system constructed in accordance with the teachings of the disclosure.

Another embodiment of a cooling and parasitic leakage air system 100 constructed in accordance with the teachings of the disclosure is depicted in FIGS. 11 and 12. As depicted therein, cooling and parasitic leakage air is directed along secondary air flow cavity 101 before being directed into the turbine section 102 in the direction of arrow 104. In accordance with the teachings of the disclosure, such secondary air flow is in substantial alignment with the primary fluid flow 106 of the gas flow path through the turbine section. In so doing, the turbine section 102 is able to be cooled without detrimentally affecting the efficiency of the engine. The system 100 may include a fluid flow direction modifier in the form of a turning hole 108 provided in a heat shield 110. The turning hole 108 is provided at an angle resulting in the desired secondary cooling flow 104.

Not only is the cooling and parasitic leakage air directed into the turbine section 102 in substantial alignment with the primary fluid flow 106, but in such an embodiment the parasitic leakage air is accelerated into the turbine section 102 to further facilitate cooling. It is able to do so through the provision of a seal 112 within the secondary flow cavity 101, specifically chamber 114, which creates a pressure drop across the turning hole 108.

From the foregoing, one of ordinary skill in the art will readily recognize that the teachings of the disclosure can be used to fabricate a gas turbine engine having improved secondary cooling capability to keep the turbine section of the gas turbine engine within optimal operating temperature parameters, while at the same time not substantially degrading engine performance. Engines constructed in accordance with the teachings of the disclosure are able to do so by ensuring that the parasitic leakage and cooling air are introduced to the turbine section in a direction substantially similar to the overall gas flow path therethrough.

What is claimed is:

1. A gas turbine engine comprising:
   a compressor section;
   a combustion section downstream of the compressor section;
   a turbine section having a longitudinal axis downstream of the combustion section;
   an axial flow plenum extending through the engine, the axial flow plenum having at least one outlet fluidically coupled to the turbine section;
   at least one fluid flow directional modifier disposed proximate the axial flow plenum; and
   wherein said at least one fluid flow directional modifier extends directly from a wall forming a trailing edge of a vane and is in the form of a turning foil with an arcuate surface along a radial direction that encourages parasitic leakage air flowing radially outwardly to be turned so as to be flowing substantially parallel to the gas flow path at the trailing edge of the vane.

2. The gas turbine engine of claim 1, wherein the fluid flow directional modifier is directly cast with the vane.

3. The gas turbine engine of claim 1, wherein the fluid flow directional modifier directs fluid radial outwardly.

4. A gas turbine engine, comprising:
   a compressor section injecting ambient air and exhausting compressed air;
   a combustion section downstream of the compressor section and receiving the compressed air, the combustion section introducing fuel to the compressed air and igniting the fuel and air to result in combustion gases;
   a turbine section having a longitudinal axis downstream of the combustion section, combustion gases traversing from the combustion section through the turbine section along a combustion gas flow path; and
   a turbine section cooling and parasitic leakage system proximate the turbine section, wherein said cooling and parasitic leakage system includes at least one flow directional modifier extending directly from a wall forming a trailing edge of a vane and is in the form of a turning foil with an arcuate surface along a radial direction that encourages parasitic leakage air flowing radially outwardly to be turned so as to be flowing substantially parallel to the combustion gas flow at the trailing edge of the vane.

5. The gas turbine engine of claim 4, wherein the fluid flow directional modifier is radially inward of the turbine section.

6. The gas turbine engine of claim 4, wherein the turbine section cooling and parasitic leakage system directs cooling and parasitic leakage air circumferentially through the turbine section.

7. A method of operating a gas turbine engine, comprising:
   compressing air in a compressor section of the gas turbine engine;

directing the compressed air into a combustion section of the gas turbine engine;

injecting fuel into the combustion section of the gas turbine engine thereby igniting the fuel and compressed air to create combustion gases;

directing the combustion gases from the combustion section into a turbine section of the gas turbine engine having a longitudinal axis along a combustion gas flow path; and directing cooling and parasitic leakage air, flowing radially outwardly, into the turbine section substantially in the direction of the combustion gas flow path with at least one fluid flow directional modifier extending from a wall forming a trailing edge of a vane and in the form of a turning foil with an arcuate surface along radial direction.

8. The method of claim 7, wherein the cooling and parasitic leakage air is introduced from a position radially inward of the turbine section.

* * * * *